US 9,394,145 B2

United States Patent
Yada et al.

(10) Patent No.: US 9,394,145 B2
(45) Date of Patent: Jul. 19, 2016

(54) METHOD FOR LIFTING AND CONVEYING BALE RUBBER AND DEVICE FOR THE SAME WITH GRIP SAFETY MECHANISM

(71) Applicant: Suzuka Engineering Co., Ltd., Yokkaichi-shi, Mie (JP)

(72) Inventors: Tatsuo Yada, Yokkaichi (JP); Yukihiro Eiraku, Yokkaichi (JP); Tomoyuki Furuichi, Yokkaichi (JP)

(73) Assignee: Suzuka Engineering Co., Ltd., Mie (JP)

( * ) Notice: Subject to any disclaimer, the term of this patent is extended or adjusted under 35 U.S.C. 154(b) by 0 days.

(21) Appl. No.: 14/666,895

(22) Filed: Mar. 24, 2015

(65) Prior Publication Data

US 2015/0274491 A1 Oct. 1, 2015

(30) Foreign Application Priority Data

Apr. 1, 2014 (JP) ................................. 2014-075736

(51) Int. Cl.
*B66C 15/00* (2006.01)
*B66C 1/10* (2006.01)
(Continued)

(52) U.S. Cl.
CPC ............... *B66C 1/101* (2013.01); *B25J 13/081* (2013.01); *B25J 15/0071* (2013.01); *B65G 63/00* (2013.01); *B66C 1/425* (2013.01); *B66C 1/427* (2013.01); *B66C 1/58* (2013.01); *B66C 1/68* (2013.01); *B66C 11/24* (2013.01); *B66C 13/14* (2013.01);
(Continued)

(58) Field of Classification Search
CPC ............ B66C 1/58; B66C 1/427; B66C 1/68; B66C 11/24; B66C 13/14; B66C 15/00; B25J 13/081; B25J 13/085; B25J 15/0071
See application file for complete search history.

(56) References Cited

U.S. PATENT DOCUMENTS 3,064,324 A * 11/1962 Schaper .................. B66C 1/425
164/405
5,054,831 A * 10/1991 Ting ...................... A01C 11/025
111/101
(Continued)

FOREIGN PATENT DOCUMENTS

DE 3643076 C1 7/1988
DE 4330498 A1 3/1995
JP 2005297091 A 10/2005

OTHER PUBLICATIONS

European Search Report for International Application No. EP 15 16 1406 dated Jul. 20, 2015 (4 pages).
(Continued)

*Primary Examiner* — Gerald McClain
(74) *Attorney, Agent, or Firm* — Fitch, Even, Tabin & Flannery, LLP

(57) ABSTRACT

A method and device are provided for lifting and conveying bale rubber from a pallet. The method may include rotationally driving a plurality of claws about a support shaft inside a claw housing case and gripping the bale rubber by protruding the plurality of claws from the case and piercing the plurality of claws into the upper surface of the bale rubber while the case is abutted against the bale rubber. A contact sensor may be provided for detecting contact of the case with the bale rubber, and with a contact signal thereof, a grip safety mechanism of the drive mechanism is disabled to allow the claws to be driven. Furthermore, a press sensor that detects a pressing load applied to the transfer place of the bale rubber may be provided so as to provide a release safety mechanism that allows gripping of the bale rubber to be released.

10 Claims, 9 Drawing Sheets

(51) Int. Cl.
*B65G 63/00* (2006.01)
*B66C 1/42* (2006.01)
*B66C 13/18* (2006.01)
*B25J 15/00* (2006.01)
*B66C 1/58* (2006.01)
*B66C 1/68* (2006.01)
*B66C 11/24* (2006.01)
*B66C 13/14* (2006.01)
*B25J 13/08* (2006.01)

(52) U.S. Cl.
CPC ............... *B66C 13/18* (2013.01); *B66C 15/00* (2013.01); *B65G 2201/025* (2013.01); *B65G 2203/0283* (2013.01); *B65G 2203/042* (2013.01)

(56) References Cited

U.S. PATENT DOCUMENTS

| | | | | | |
|---|---|---|---|---|---|
| 5,114,132 | A | * | 5/1992 | Arato | B65H 3/22 221/213 |
| 5,116,094 | A | * | 5/1992 | Jones | B25J 15/02 294/61 |
| 5,649,636 | A | * | 7/1997 | Baumann | B66C 1/663 212/276 |
| 6,112,680 | A | * | 9/2000 | Hummer | A01B 45/045 111/200 |
| 6,309,001 | B1 | * | 10/2001 | Sherwin | A21C 9/08 294/100 |
| 7,536,946 | B2 | * | 5/2009 | Hinrichs | B65G 47/90 271/18.3 |
| 8,141,920 | B2 | * | 3/2012 | Butler | B25J 15/0071 294/26 |
| 8,714,608 | B2 | * | 5/2014 | Cho | B25J 15/0071 294/207 |
| 8,888,154 | B2 | * | 11/2014 | Tvetene | B66C 1/22 294/128 |
| 2007/0290516 | A1 | * | 12/2007 | Buljo | A22C 17/0093 294/61 |
| 2009/0146440 | A1 | * | 6/2009 | Buljo | A01K 17/00 294/61 |
| 2011/0187138 | A1 | * | 8/2011 | Maffeis | B25J 15/0071 294/61 |

OTHER PUBLICATIONS

Suzuka Engineering Co., Ltd., Cutting Device, Samurai Cutter, 14 pages, published Oct. 1, 2013.

* cited by examiner

METHOD FOR LIFTING AND CONVEYING BALE RUBBER AND DEVICE FOR THE SAME WITH GRIP SAFETY MECHANISM

CROSS-REFERENCE TO RELATED APPLICATION

This application claims priority under 35 U.S.C. §119 to Japanese Patent Application No. 2014-075736, filed Apr. 1, 2014, which is incorporated by reference herein in its entirety.

FIELD

The present invention relates to a method for lifting and conveying bale rubber and a device for the same that are capable of, with swift manipulability and with a stable holding operation, handling, especially lifting and conveying, raw rubber that is shaped into a bale shape, while enhancing safety and allowing labor saving in the raw rubber processing process to be achieved.

BACKGROUND

Conventionally, in response to worldwide increase in the production of bale rubber complying with international standards, transporting form thereof has changed to bulk handling. In the early years of synthetic rubber production, synthetic rubber that has been compressed and molded into a bale with a press was piled high after being wrapped with a thin, low melting point polyethylene film. In such a case, due to the pressure caused by high piling, deformation called cold flow occurred at the lower portion of the bale rubber, and since the polyethylene film was torn due to the deformation and since the rubber stuck out, there were cases in which the bale rubber was transported while being packed in a three plied kraft paper sack having strength to prevent tear; however, since the raw synthetic rubber was stacked on a pallet in multilayers amounting to over a ton, the bale rubber at the lower portion was deformed due to weight-induced pressure from above and, accordingly, the bale rubber tore out of the paper sack and exposed itself and, in the end, the stacked and piled state was torn down making transportation difficult. Accordingly, a strong kraft paper sack was in demand.

However, especially during long-distance transportation in the summer season, deformation due to cold flow occurred frequently making it most difficult to wipe out paper sack tearing incidents; accordingly, wooden framed box-shaped pallet was put into practical use. However, due to measures against wasteful use of wood resource and due to problems of foreign matters such as wood chips getting mixed, the packaging form has further been changed to stacking and piling the bale rubber, which has been wrapped by film without any paper sack packaging, inside a recoverable and reusable box-shaped metal pallet. Furthermore, in recent years, it has become typical to internationally distribute the bale rubber accommodated inside a knock-down box-shaped pallet formed of thin steel plates.

The boxed-shaped metal pallet accommodates 30 pieces of 35 kg bale rubber (about one ton), and in rubber processing factories, stacking and storing three box-shaped pallets are normally the case and the box-shaped pallets are designed for such storing; however, when even a single side plate of the pallet is removed, the strength for stacking and storing is lost. Moreover, when the bale rubber is unloaded from the box-shaped pallet for cutting and weighing, in order to simplify work, the plate on the lateral side of the box-shaped pallet is dismounted to unload the bale rubber.

However, as regards the pallet in which one side plate has been removed, it is difficult to return the removed plate and reuse the box-shaped pallet. In other words, when one side plate of the box-shaped pallet is removed, the bale rubber at the lower portion that has been accumulating the weight-induced pressure from the bale rubber at the upper portion until then instantaneously tears the thin polyethylene film packaging and starts to swell; accordingly, the box-shaped pallet that is a knock-down type structured so that the side plates are inserted thereto cannot reset the dismounted plate as long as there is bale rubber inside. As a result, the box-shaped pallet that has been stacked in three layers loses its strength that allowed staking to be performed in multilayers, thus, leaving no other way of storage but to place the pallet flat in a single layer and, thus, requiring a large storage space.

Since there are such problems, there is an earnest demand in rubber processing factories to unload the bale rubber from the box-shaped pallet without dismantling the box-shaped pallet. Regarding the work of taking the 35 kg bale rubber out, if it is continuous work, even just putting the bale rubber on a conveyer from a flat pallet becomes hard work and many lower back disorders are induced. Labor law restricts working environments in which a heavy load of 20 kg or more is continuously carried by man and, furthermore, although a synthesis resin manufacturer is on the way to commercializing a bale-shape that is a 35 kg bale cut into half, it has been evaluated that it is not suitable for transportation since it lacks stability during stacking. In such a case, by halving the formed thickness dimension of the bale rubber, the stacking stability is resolved; however, the production capacity of the synthetic rubber manufacturing process is reduced by half and it is inevitable that a large amount of investment is needed in reorganizing the manufacturing process; accordingly, the above cannot be achieved easily. The above state is the reason why rubber processing factories are waiting for a simple device that can handle bale rubber to be put into practical use.

The following are labor-saving machinery that are the kind of labor-saving machinery for work described above that has been put into practical use until now.

First, in a gripping tool made of steel called "ice gripper" that has a general structure, when two gripping arms that have two internally oriented claws that face each other at the distal ends and that are rotatably attached while being intersected at a fulcrum are lifted by being suspended with a chain or wire, the two claws at the distal ends of the intersecting two gripping arms grip and hang the ice or the like facilitating lateral movement. "Ice grippers" that are used to handle bale rubber are known.

However, since the above-described "ice gripper" needs to pinch the opposing lateral surfaces of the bale rubber with large gripping arms, in order to have the gripping arms interpose between the appressed bale rubber inside the box-shaped pallet, work such as tearing the bale rubber apart with a hook so as to provide vacant spaces allowing the gripping arms to enter is indispensable. Furthermore, since the hanging mechanism needs to be wire or a chain that has flexibility, when moved laterally while being hung, the bale rubber with weight becomes a pendulum and swings; accordingly, it is unstable and effort and skill are required in maintaining the bale rubber and in handling the operation switch of the hoist.

Furthermore, as described above, when the bale rubber is wrapped in polyethylene film and is accommodated inside the box-shaped pallet, even though through the film, the bales are appressed to each other and deformation of the bale rubber cannot be totally avoided; accordingly, it is not possible to unload the bale with the force of the vacuum suction pad of the vacuum suction type lifter that has been in practical use as before and unloading work is carried out by removing the side plate of the box-shaped pallet. Particularly, in rubber factories for industrial products that process a variety of types of bale rubber, such as automobile parts, a tool that allows the bale rubber to be unloaded without dismantling the box-shaped pallet is awaited for from an aspect of the storage area.

Furthermore, there is a device having a weight balance function including a vacuum suction type hand portion in which lifting/lowering and horizontal movement can be performed freely. The above is a device that can easily lift bale rubber with the weight balance function by, while the operator holds on to the operation handle equipped on the hand portion, operating an operation element for vacuum action while having a large suction pad abut against the center of the surface of the bale rubber and by attracting the bale rubber to the suction pad. Although the above devices have been put into practical use, because satisfactory unloading of the bale rubber is not necessarily achieved as described below, appearance of a user-friendly device is awaited.

The inconvenience of the "ice gripper" is resolved in the above-described device provided with the vacuum suction type handle portion. In particular, it is advantageous in that there is a suction operation element on the operation handle of the suction pad that constitutes the hand portion and that suction can be performed before lifting the bale rubber with the handle. Regarding the lifting of the bale rubber, since the hand portion is mounted on the arm of a vertically and horizontally moving device having a weight balance structure, stability in maintaining spatial position is good and the lifting force required may be one that is enough to guide the lifting/lowering. However, there is a serious weakness in that when the surface of the bale rubber is not smooth, degree of vacuum that supports the weight cannot be maintained and the bale rubber cannot be lifted. When the thin polyethylene film is absorbed and when the film is detached from the surface of the bale rubber, the film becomes torn and the bale rubber drops off. Furthermore, when the bale rubber are appressed to each other inside the box-shaped pallet, lifting power becomes insufficient and lifting cannot be performed unless the appressed bale rubber are torn apart from each other with a hook. The side plates around the box-shaped pallet is roughly 1.2 m, and after unloading 10 bales, unless a side plate on one side of the knock-down box-shaped pallet is removed, the suction pad of the hand portion cannot reach the bale rubber and suction operation cannot be carried out. Accordingly, in any case, in existing devices, there is difficulty in unloading the bale rubber inside the box-shaped pallet without dismantling the box-shaped pallet.

SUMMARY

The technical subject of the present disclosure is, basically, to provide a method for lifting and conveying bale rubber and a device for lifting and conveying bale rubber that, when conveying bale rubber that are deformed and are appressed to each other and that are accommodated in a box-shaped pallet or when conveying bale rubber that is stored in an environment equivalent to the above, do not need work or the like of making vacant spaces where gripping arms can enter by tearing off portions between the bale rubber with a hook, that firmly grip the bale rubber from the upper surface of the bale rubber with claws, that lift and unload the bale rubber safely and easily with high manipulability, and that transfer the bale rubber to a target position such as a cutting machine or a conveyor.

More specifically, the technical subject of the present disclosure is to provide the method for lifting and conveying bale rubber and the device for lifting and conveying bale rubber that, when lifting is performed to convey the bale rubber by firmly gripping the upper side of the bale rubber with claws having acute tips, perform a gripping operation in a safe state in which preparation of gripping has been made, and, that do not drop the bale rubber during conveying the bale rubber and until a point when cancellation of the gripping operation can be carried out safely, such that labor saving of the raw rubber processing process is achieved while conveying is performed with a stable gripping operation with enhanced safety.

In order to overcome the above problems, according to the present disclosure, there is provided a method for lifting and conveying bale rubber, including: supporting a plurality of claws inside a claw housing case including a claws-entering-and-exiting surface on an undersurface side that comes into contact with an upper surface of bale rubber that is an object of the lifting, a distal end of each of the plurality of claws being made acute by gradually reducing the diameter from a base end side to a distal end side and a central axis line of each of the plurality of claws being bent so as to form an arc shape about an axis line of a rotational drive, the plurality of claws being supported so as to be capable of being rotationally driven in a direction extending along the central axis line having the arc shape about the axis line of the rotational drive disposed horizontally; gripping the bale rubber by protruding each of the plurality of claws through a corresponding one of openings provided in the claws-entering-and-exiting surface and by piercing the plurality of claws into the bale rubber from an upper surface of the bale rubber so as to draw a trajectory having the arc shape, while the claws-entering-and-exiting surface is abutted against the bale rubber that is the object of the lifting; and transferring the bale rubber that has been gripped with the claws to a target position with a conveying mechanism that moves laterally, after lifting the bale rubber together with the claw housing case with a lift mechanism, in which an operation of gripping the bale rubber with the claws is performed by providing a detection tip of a contact sensor detecting contact made with the bale rubber on the claws-entering-and-exiting surface of the claw housing case, disabling a grip safety mechanism in the operation circuit of the drive mechanism gripping the bale rubber with a contact signal generated by the contact sensor upon contact with the bale rubber, and enabling driving of the claws performed with the drive mechanism upon operation of a gripping operation element.

Furthermore, in order to overcome the above problems, according to the present disclosure, there is provided a method for lifting and conveying bale rubber, including: supporting a plurality of claws inside a claw housing case including a claws-entering-and-exiting surface on an undersurface side that comes into contact with an upper surface of bale rubber that is an object of the lifting, a distal end of each of the plurality of claws being made acute by gradually reducing the diameter from a base end side to a distal end side and a central axis line of each of the plurality of claws being bent so as to form an arc shape about an axis line of a rotational drive, the plurality of claws being supported so as to be capable of being rotationally driven in a direction extending along the central axis line having the arc shape about the axis line of the rotational drive disposed horizontally; gripping the bale rubber by protruding each of the plurality of claws through a corresponding one of openings provided in the claws-entering-and-exiting surface and by piercing the plurality of claws into the bale rubber from an upper surface of the bale rubber so as to draw a trajectory having the arc shape, while the claws-entering-and-exiting surface is abutted against the bale rubber that is the object of the lifting; and transferring the bale rubber that has been gripped with the claws to a target position with a conveying mechanism that moves laterally, after lifting the bale rubber together with the claw housing case with a lift mechanism, in which the operation of gripping the bale rubber with the claws is cancelled by providing a press sensor detecting a pressing load received by a lift cylinder upon transferring the bale rubber gripped with the claws to a transfer place, disabling a release safety mechanism in a circuit for gripping the bale rubber with the claws with a grip release signal generated when a press protrusion in the claw housing case comes into pressure contact with the press sensor upon lowering of the bale rubber with the lift cylinder, and enabling cancellation of a gripping operation of the claws performed with the drive mechanism upon operation of a release operation element.

In a preferred exemplary embodiment of the method for lifting and conveying bale rubber according to the present disclosure, it is desirable that a depth in which the claws are pierced into the bale rubber, the bale rubber being an object of lifting, is ¼ to ½ of the mean thickness of the bale rubber and, at a piercing limit, central axis line of each of the distal ends of opposing pair of claws having an arcuate shape does not become horizontal and, moreover, each of the distal ends of the pair of claws grips the rubber bale while at a position that do not come into contact with each other.

Meanwhile, in order to overcome the above problems, according to the present disclosure, there is provided a bale rubber lifting and conveying device, including a gripping device that grips bale rubber that is an object of lifting with a claw, in which in an undersurface side of a claw housing case of the gripping device serving as a claws-entering-and-exiting surface that comes into contact with an upper surface of the bale rubber when gripping the bale rubber, opening portions through which a plurality of claws appear and disappear are formed on the claws-entering-and-exiting, and in the claw housing case, a distal end of each of the plurality of claws is made acute by gradually reducing the diameter from a base end side to a distal end side and a central axis line of each of the plurality of claws is bent so as to form an arc shape about an axis line of a rotational drive, the plurality of claws being supported so as to be capable of being rotated in a direction extending along the central axis line having the arc shape about the axis line of the rotational drive disposed horizontally, a claw drive mechanism for piercing the plurality of claws from the upper surface of the bale rubber in a gripping manner through the opening portions of the claws-entering-and-exiting surface while drawing a trajectory with the arcuate shape is provided on a frame of the gripping device, a detection tip of a contact sensor that detects contact made with the bale rubber is disposed on the claws-entering-and-exiting surface of the claw housing case and a grip safety mechanism is disposed in an operation circuit of the claw drive mechanism that grips the bale rubber, the grip safety mechanism making the claws non-operative by opening the operation circuit when the contact sensor in not in contact with the bale rubber, the grip safety mechanism cancels the non-operative state by a contact signal generated by the contact sensor when in contact with the bale rubber and enables an operation of gripping the bale rubber with the claws by closing the operation circuit of the claw drive mechanism upon operation of a gripping operation element, and the gripping device is coupled to a conveying mechanism that laterally moves the gripping device through a lift mechanism including a hydraulically driven lift cylinder.

A preferable exemplary embodiment of the bale rubber lifting and conveying device according to the present disclosure is configured such that the contact sensor is constituted by a directional control valve that operates when detecting contact between the detection tip disposed on the claws-entering-and-exiting surface and the bale rubber, the grip safety mechanism is constituted by a direction control valve that uses a pilot fluid pressure that is output upon operation of the directional control valve as the contact signal to switch a supply flow path that supplies fluid pressure to a grip cylinder constituting the drive mechanism of the claws to a direction that makes the claws be pierced into the bale rubber, and a flow path is formed in which the operation of gripping the bale rubber with the claws is allowed upon operation of the gripping operation element while in a state in which the contact signal is output.

In a preferable exemplary embodiment of the bale rubber lifting and conveying device, it is desirable that the claw housing case is provided with a press sensor detecting a pressing load received by a lift cylinder upon transferring the bale rubber gripped with the claws to the transfer place and a press protrusion that is pressed against the press sensor when pressing against the transfer place of the bale rubber with the lift cylinder, a release safety mechanism that allows release of the claws upon an output of the press sensor when the press protrusion comes into pressure contact with the press sensor is disposed in the operation circuit of the drive mechanism for gripping the bale rubber with the claws, and upon an operation of a grip release operation element while the release safety mechanism is in a state allowing the release of the claws, the operation circuit of the claw drive mechanism is switched allowing the cancellation of the operation of gripping the bale rubber with the claws.

Furthermore, in a preferable exemplary embodiment of the bale rubber lifting and conveying device, the press sensor may be constituted by a directional control valve operating when detecting the pressing load received by the lift cylinder of the bale rubber gripped with the claws to the transfer place the release safety mechanism may be constituted by guiding a pilot fluid pressure that is output upon operation of the directional control valve to a direction control valve that switches the supply flow path of the fluid pressure to the grip cylinder constituting the claw drive mechanism to a direction that releases the claws pierced into the bale, and a flow path may be formed that cancels the operation of gripping the bale rubber with the claws upon operation of the grip release operation element while in a state in which the direction control valve is switched to a direction that releases the claws.

Furthermore, in order to overcome the above problems, according to the present disclosure, there is provided a bale rubber lifting and conveying device, including: a gripping device that grips bale rubber that is an object of lifting with a claw, in which in an undersurface side of a claw housing case of the gripping device serving as a claws-entering-and-exiting surface that comes into contact with an upper surface of the bale rubber when gripping the bale rubber, opening portions through which a plurality of the claws appear and disappear are formed on the claws-entering-and-exiting surface, and in the claw housing case, a distal end of each of the plurality of the claws is made acute by gradually reducing the diameter from a base end side to the distal end side and a central axis line of each of the plurality of claws is bent so as to form an arc shape about an axis line of a rotational drive, the plurality of claws being supported so as to be capable of being rotated in a direction extending along the central axis line having the arc shape about the axis line of the rotational drive disposed horizontally, a claw drive mechanism for piercing the plurality of claws from the upper surface of the bale rubber in a gripping manner through the opening portions of the claws-entering-and-exiting surface while drawing a trajectory with the arcuate shape is provided on a frame of the gripping device, the claw housing case is provided with a press sensor detecting a pressing load received by a lift cylinder upon transferring the bale rubber gripped with the claws to the transfer place and a press protrusion that is pressed against the press sensor when pressing against the transfer place of the bale rubber with the lift cylinder, a release safety mechanism that allows release of the claws upon an output of the press sensor when the press protrusion comes into pressure contact with the press sensor is disposed in the operation circuit of the drive mechanism for gripping the bale rubber with the claws, upon an operation of a grip release operation element while the release safety mechanism is in a state allowing the release of the claws, the operation circuit of the claw drive mechanism is switched allowing the cancellation of the operation of gripping the bale rubber with the claws, and the gripping device is coupled to a conveying mechanism that laterally moves the gripping device through a lift mechanism including a hydraulically driven lift cylinder.

A preferable exemplary embodiment of the bale rubber lifting and conveying device according to the present disclosure is configured such that the press sensor is constituted by a directional control valve operating when detecting the pressing load received by the lift cylinder of the bale rubber gripped with the claws to the transfer place, the release safety mechanism is constituted by guiding a pilot fluid pressure that is output upon operation of the directional control valve to a direction control valve that switches the supply flow path of the fluid pressure supplied to the grip cylinder constituting the claw drive mechanism to a direction that releases the claws pierced into the bale rubber, and a flow path is formed that cancels the operation of gripping the bale rubber with the claws upon operation of the grip release operation element while in a state in which the direction control valve is switched to a direction that releases the claws.

Furthermore, in a preferred exemplary embodiment of the bale rubber lifting and conveying device according to the present disclosure, it is desirable that the claws provided in a plurality of pairs are each attached to a corresponding one of drive arms that rotates about a support shaft disposed in a horizontal manner inside the claw housing case and are disposed so as to oppose each other when distal ends that are made acute protrudes out through the opening portions of the claws-entering-and-exiting surface, and a claw drive mechanism operates the drive arms so that the drive arms rotate about the support shaft, the support shaft is installed in a middle portion inside the claw housing case in a horizontal manner and supports a plurality of pairs of the drive arms of the claws, grip cylinders that constitute the drive mechanism are each supported against the frame so as to be rotatable within a flat surface that is parallel to the rotation surface of the corresponding claw and the distal ends of the piston rods of the grip cylinders are each coupled to the base end of the corresponding claw in a rotatable manner, and a depth in which the claws are pierced into the bale rubber, the bale rubber being an object of lifting, is ¼ to ½ of the mean thickness of the bale rubber and, at a piercing limit, central axis line of each of the distal ends of opposing pair of claws having an arcuate shape does not become horizontal and, moreover, each of the distal ends of the pair of claws are at a position that do not come into contact with each other.

In the method for lifting and conveying bale rubber and the device for lifting and conveying bale rubber that have the above-described configuration, the gripping mechanism, which is an important mechanism, not only performs gripping but adopts a lifting method in which the claws are pierced into the bale rubber from the upper surface of the bale rubber.

Moreover, by making each of the distal ends of the claws acute by gradually reducing the diameter from a base end side to a distal end side and by bending a central axis line of each of the claws so as to form an arc shape about an axis line of a rotational drive for gripping, the claws are made to pierce deep into the bale rubber in a smooth manner and are formed in a shape that allows the claws to be inserted to a depth that does not allow the portions where the claws are pierced to break with the weight of the rubber itself, and, further, the claws have an advantage in that when the claws are inserted into the bale rubber, fragments of the torn wrapping film are not created, and that upon insertion of the claws, no foreign matters are involved therein.

Furthermore, since the above-described claws that grip the bale rubber have an acute shape as described above, unless the gripping operation element is operated while the claws-entering-and-exiting surface on the undersurface side of the claw housing case in contact with the upper surface of the bale rubber that is the object of the lifting is abutted against the upper surface of the bale rubber, the claws are not exposed from the housing case; accordingly, a storage structure and an operation control mechanism that do not injure the fingers and hands of the operator are provided. Furthermore, even when the grip release operation element is touched by mistake while the gripped bale rubber is conveyed, since it is configured so that the claws do not come out from the bale rubber, the gripped bale rubber will not fall off unless the bale rubber has been transferred to the targeted conveying place; in this point too, safety of the operator is maintained.

According to the method for lifting and conveying bale rubber and the device for lifting and conveying bale rubber of the present disclosure that have been described in detail above, when conveying bale rubber that are deformed and are appressed to each other and that are accommodated in a box-shaped pallet or when conveying bale rubber that is stored in an environment equivalent to the above, there is no need to work or the like to make vacant spaces where gripping arms can enter by tearing off portions between the bale rubber with a hook, the bale rubber is firmly gripped from the upper surface of the bale rubber with claws, the bale rubber is lifted and unloaded safely and easily with high manipulability, and the bale rubber can be transferred to a target position such as a cutting machine or a conveyor.

Furthermore, when lifting is performed to convey the bale rubber by firmly gripping the upper side of the bale rubber with claws with acute tips, a gripping operation is performed in a safe state in which preparation of gripping has been made, and, the bale rubber is not dropped while conveying the bale rubber and until a point when cancellation of the gripping operation can be carried out safely, such that lifting and conveying of the bale rubber can be performed that allows labor saving of the raw rubber processing process to be achieved while conveying is performed with a stable gripping operation with enhanced safety.

DETAILED DESCRIPTION OF THE PREFERRED EMBODIMENTS

In a bale rubber lifting and conveying device according to the present disclosure, bale rubber 51 that are accommodated in a knock-down box-shaped pallet 50 described above, or bale rubber 51 that are stored in an environment equivalent to the knock-down box-shaped pallet 50 is the object to be conveyed. In the box-shaped pallet 50, the bale rubber 51 that are accommodated therein are appressed to each other and are deformed. In a gripping device 7 of the bale rubber 51 according to the present disclosure, since the bale rubber 51 that are appressed to each other are gripped by a plurality of claws 8 pierced into an upper surface thereof, not only work related to tearing off can be saved of its labor such as tearing off the bale rubber with a hook to create vacant spaces in which the gripping arms of the "ice gripper" described above enter in order to interpose the gripping arm between the bale rubber 51, the bale rubber 51 can be unloaded without detaching a plate on a lateral side of the box-shaped pallet 50 and without creating any hindrance in storing, and a mechanical-device-like tool that has swift handling ability and manipulability can be provided.

Figure 1:
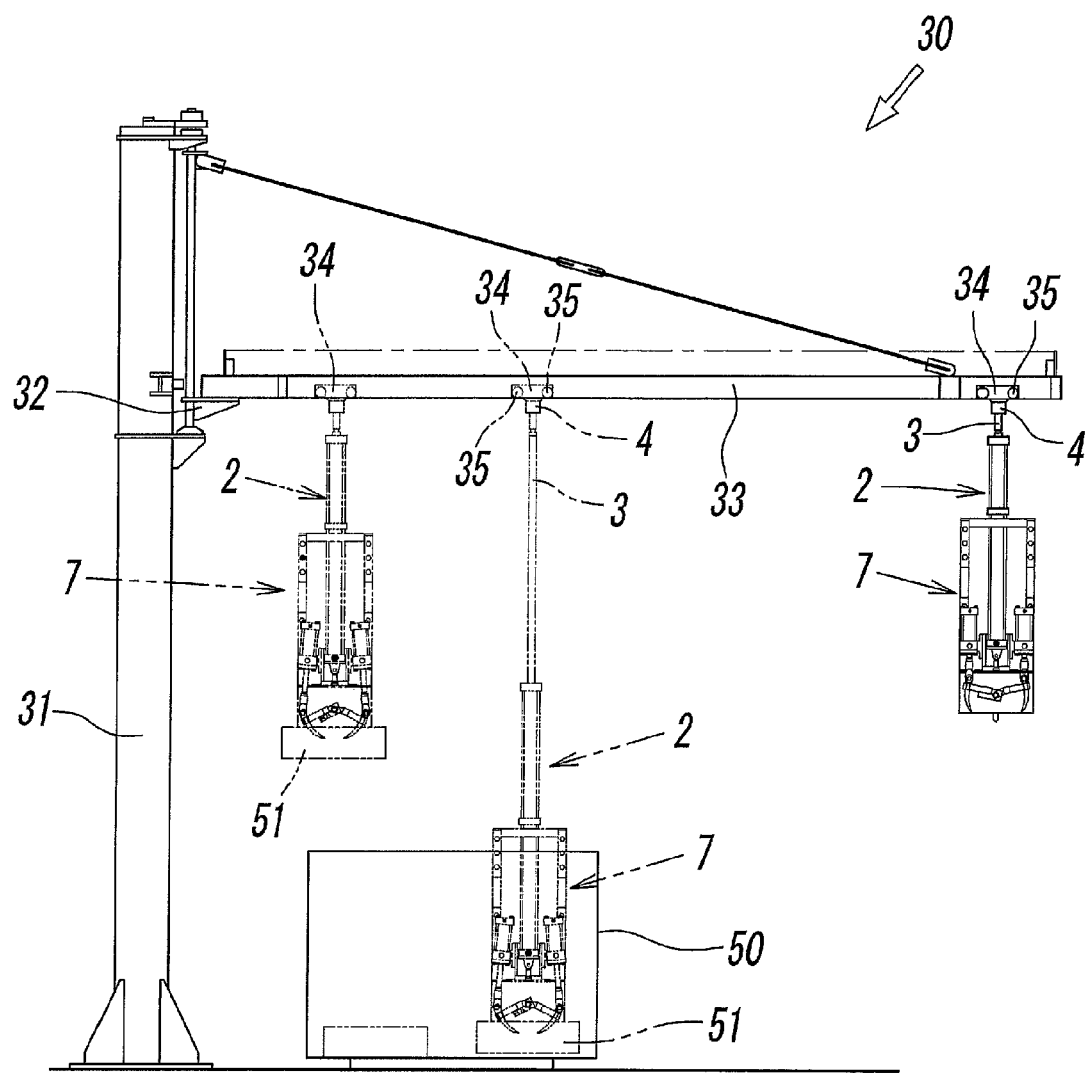
FIG. 1 is a side view illustrating an overall configuration of an exemplary embodiment in which a bale rubber lifting and conveying device according to the present disclosure is applied to a jib crane-type conveying device.
Figure 2:
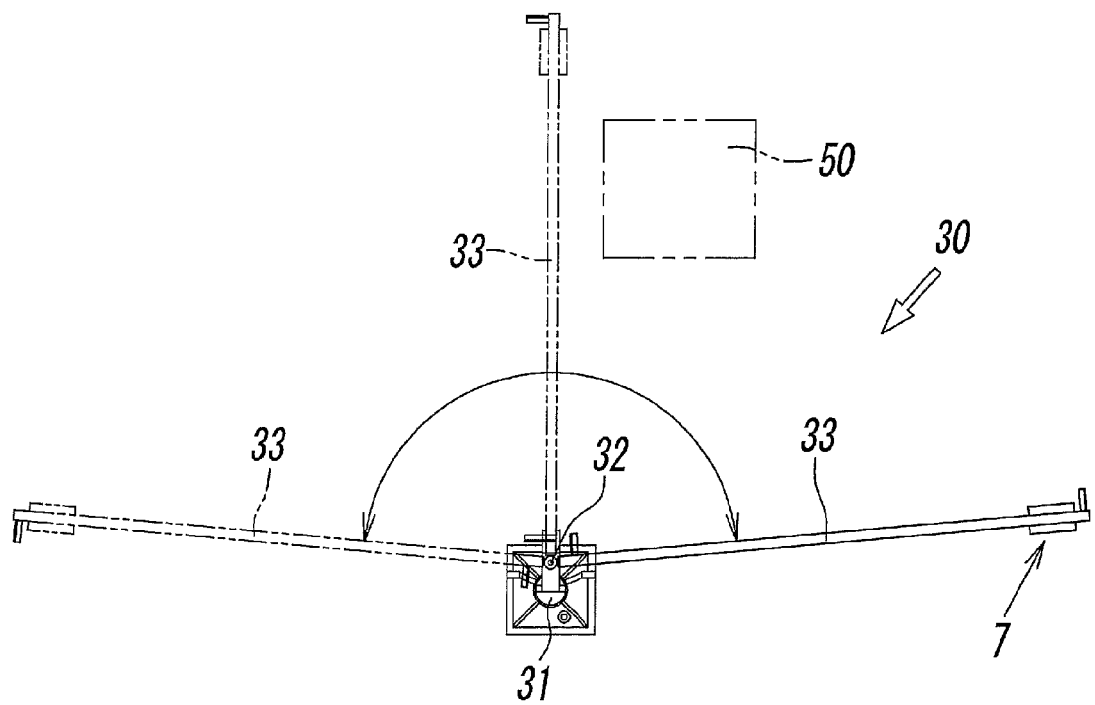
FIG. 2 is a plan view of the same.

FIG. 1 and FIG. 2 illustrates an overall configuration of an exemplary embodiment that uses the bale rubber lifting and conveying device according to the present disclosure applied to a jib crane-type conveying device 30. The lifting and conveying device includes a beam 33, serving as a rail, that is protruded in a horizontal direction from an upper portion of a post 31 standing erect in a fixed manner and that is supported by the above-described post 31 so as to be capable of being manually swung about an attaching portion 32 of the post 31 in a wide range as illustrated in FIG. 2, and a conveying mechanism that laterally moves the gripping device 7 of the bale rubber 51 by having a traverser 34 including four wheels 35 to move along the rail in the longitudinal direction of the rail.

The above-described traverser 34 supports the gripping device 7 of the bale rubber 51 through a lift mechanism formed of a hydraulically driven lift cylinder 2. More specifically, the above-described lift cylinder 2 is coupled to the traverser 34 through a universal joint 4 attached to the distal end of a piston rod 3 and the four wheels 35 that are rotatably attached to both sides of the traverser 34 are supported so as to be capable of running along the rail of the above-described beam 33. As described above, when configured such that the traverser 34 supports the gripping device 7 of the bale rubber 51 and such that the traverser 34 is moved laterally with a manual push, using the hydraulically driven lift cylinder 2 as the above-described lift mechanism and rotatably attaching the distal end of the piston rod 3 of the lift cylinder 2 serving as a hanging fulcrum to the traverser 34 on the rail with the pin are effective in obtaining stable manipulability in a case in which the bale rubber 51 is lifted out at a lift distance that allows lifting over the wall of the side plate of the box-shaped pallet 50. In particular, it is effective for stable manipulability that a structure that maintains a firm linear shape from the hanging fulcrum and under is obtained with the lift cylinder 2.

Furthermore, the attachment of the lift cylinder 2 to the traverser 34 is, as described above, performed by coupling the distal end of the piston rod 3 of the lift cylinder 2 through the universal joint 4; accordingly, the gripping device 7 that is hung down with the above is capable of being reciprocally turned 350° about a vertical axis by a operation handle 12 described later (see FIG. 3), which is provided in the gripping device 7, through a manual operation. The turning is dependent on the fact that a piston of the lift cylinder 2 is capable of being turned in a piston chamber inside a cylinder body 2a; however, another turning mechanism may be provided separately.

Note that a state in which the bale rubber 51 inside the box-shaped pallet 50 is gripped with the gripping device 7, a state in which the gripped bale rubber 51 is conveyed, and the like are all illustrated side-by-side in FIG. 1.

Figure 3:
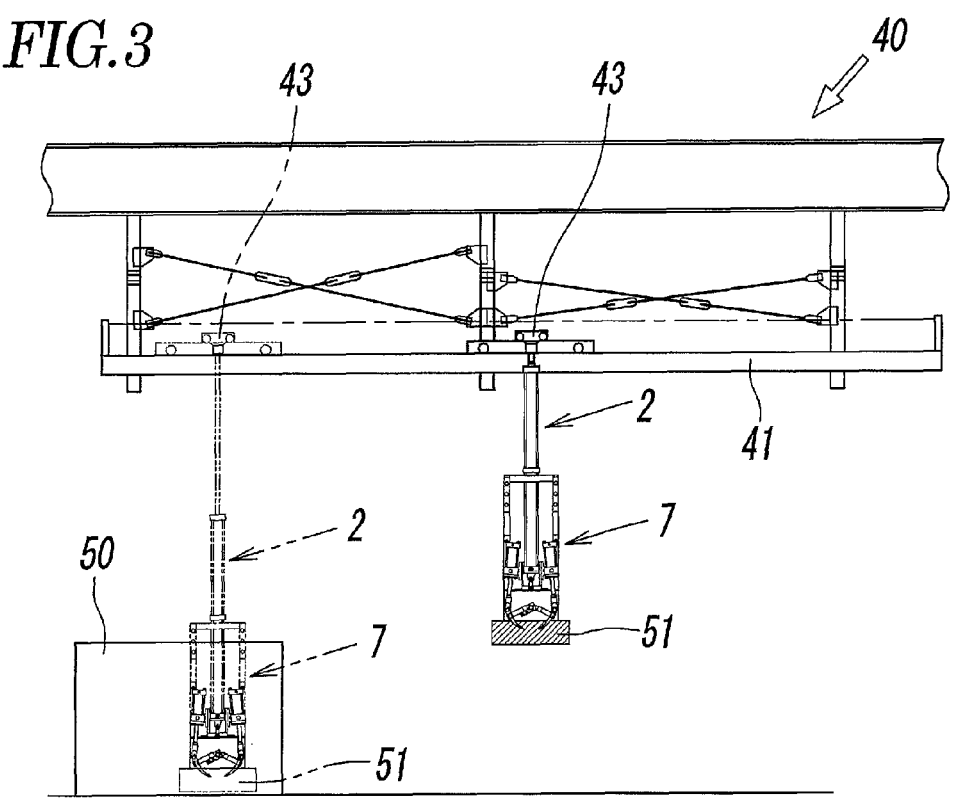
FIG. 3 is a side view illustrating an overall configuration of an exemplary embodiment in which the bale rubber lifting and conveying device according to the present disclosure is applied to a crane-type conveying device that performs conveying in a travelling range defined by an X-Y plane.
Figure 4:
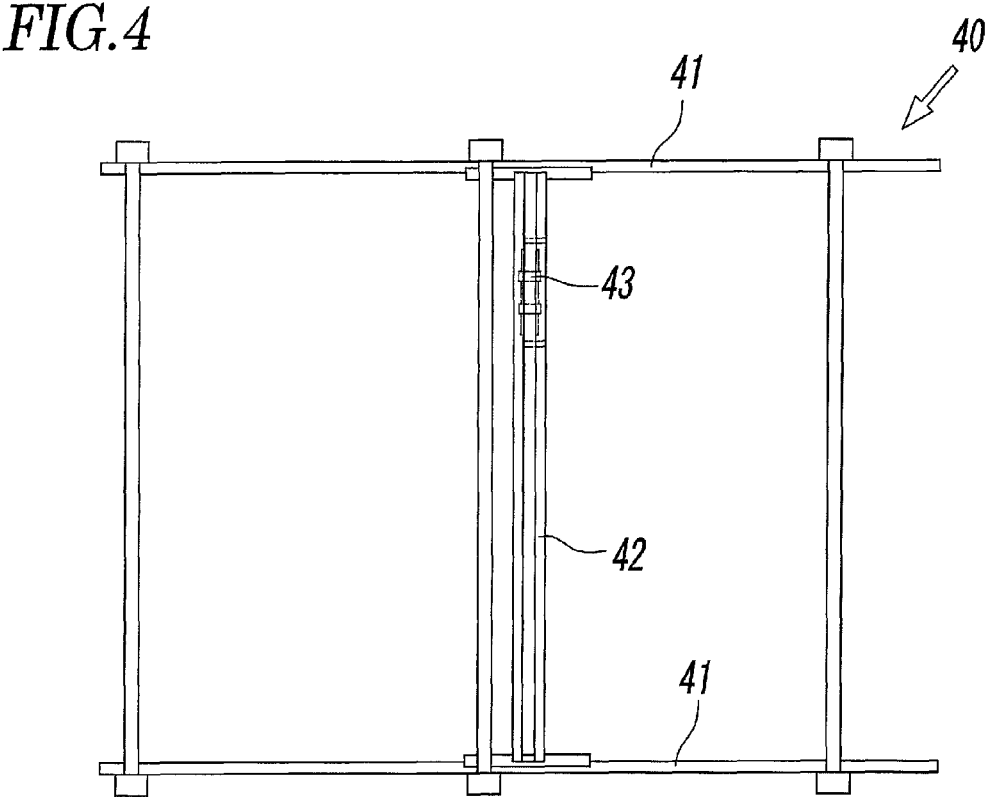
FIG. 4 is a plan view of the same.

Meanwhile, FIG. 3 and FIG. 4 illustrates an overall configuration of an exemplary embodiment in which the lifting and conveying device of the bale rubber 51 according to the present disclosure is applied to an X-Y traveling crane-type conveying device 40 that performs conveying in a traveling range having a planar shape formed by rails 41 and 42 in the X-Y direction.

In the crane-type conveying device 40, there are provided two parallel X-direction rails 41 constructed at an upper portion inside the building and a Y-direction rail 42 that is suspended over the X-direction rails 41 so as to allow travelling in the X-direction. A traverser 43, which is configured in a similar manner to the traverser 34 of the jib crane-type conveying device 30 described above, travels along the above-described Y-direction rail 42. The configuration in which the traverser 43 supports the gripping device 7 of the bale rubber 51 through the lift mechanism formed of the hydraulically driven lift cylinder 2 has no substantial difference from the jib crane-type conveying device 30 described above.

Note that in the above-described crane-type conveying device 40, since the above-described Y-direction rail 42 allows the traverser 43 to travel thereon, if needed, a suspending ring may be fixed on the upper surface of the traverser 43 and a wire that is passed through the suspending ring in the Y direction may be stretched across both ends of the Y-direction rail 42 so as to prevent the traverser 43 from falling off the Y-direction rail 42 due to a quake during an earthquake or due to other troubles. Furthermore, by having suspending rings be fixed to both ends of the Y-direction rail 42 and wires stretched across the two X-direction rails 41 be passed through the suspending rings, falling off of the Y-direction rail 42 can be prevented in a similar manner.

Furthermore, in both of the above-described conveying devices 30 and 40, if a wire or a chain is coupled to a portion between the traverser 34 or 43 that travels on the rail and the bracket that is attached to the distal end of the piston rod 3, danger of the whole lift cylinder 2 and gripping device 7 falling can be averted even when a destructive accident occurs in the universal joint that couples the traverser and the piston rod.

The lifting device of the bale rubber 51 used in the above-described conveying device 30 and 40 described above will be described in detail next.

Figure 5:
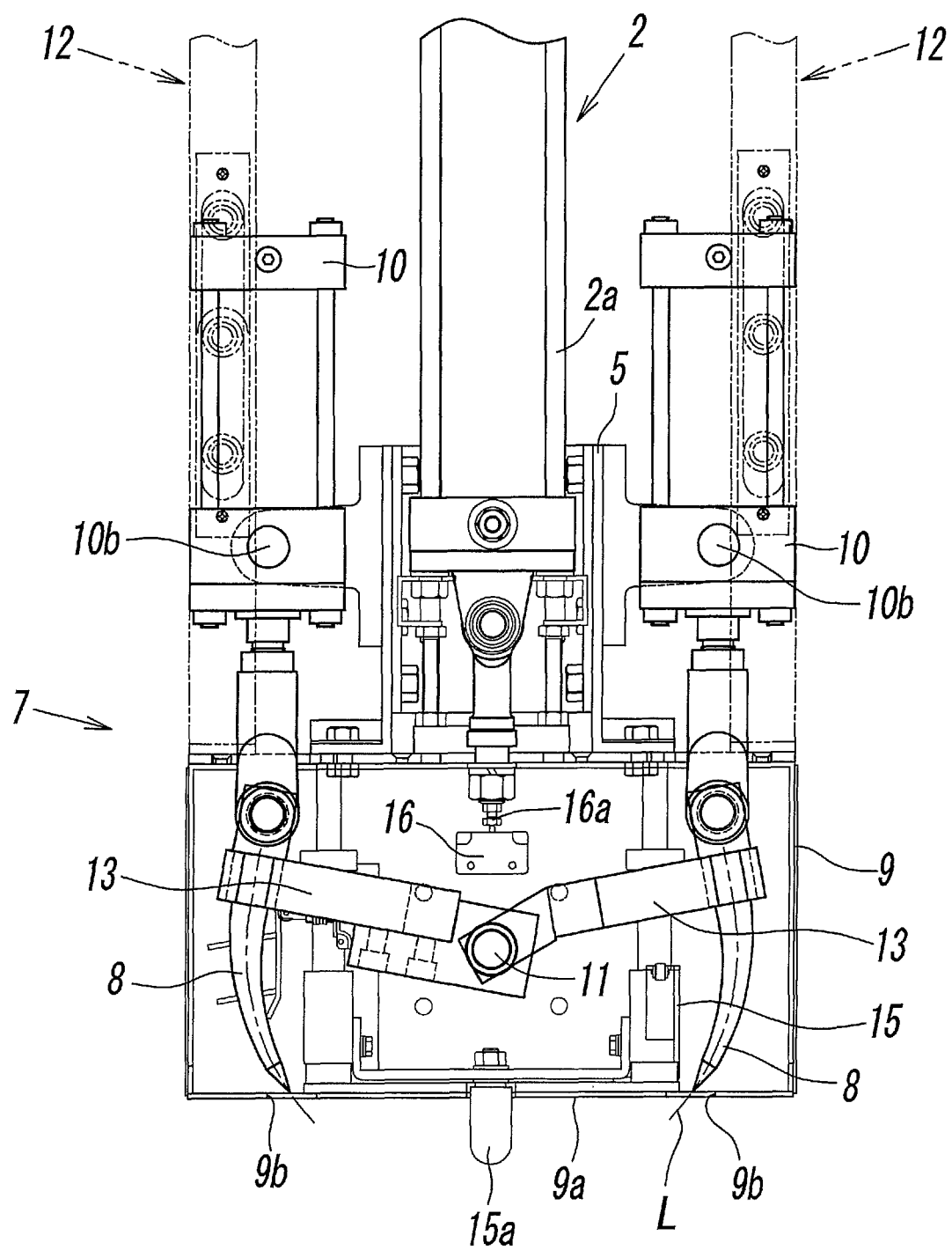
FIG. 5 is an enlarged cross-sectional view illustrating a state in which claws of the bale rubber gripping device are not protruded.
Figure 6:
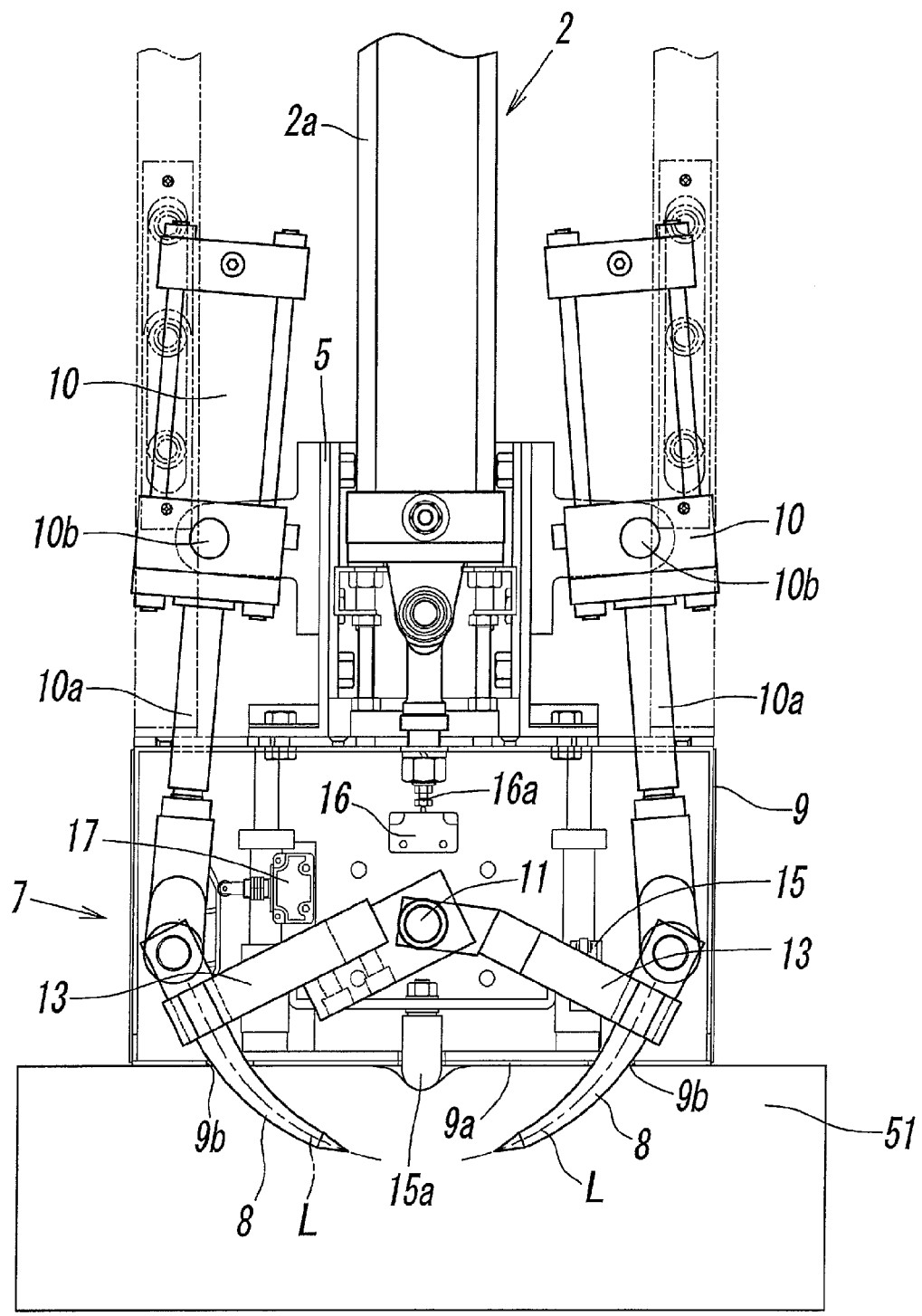
FIG. 6 is an enlarged cross-sectional view illustrating a state in which the same claws are protruded from the claw housing case and are gripping the bale rubber.
Figure 7:
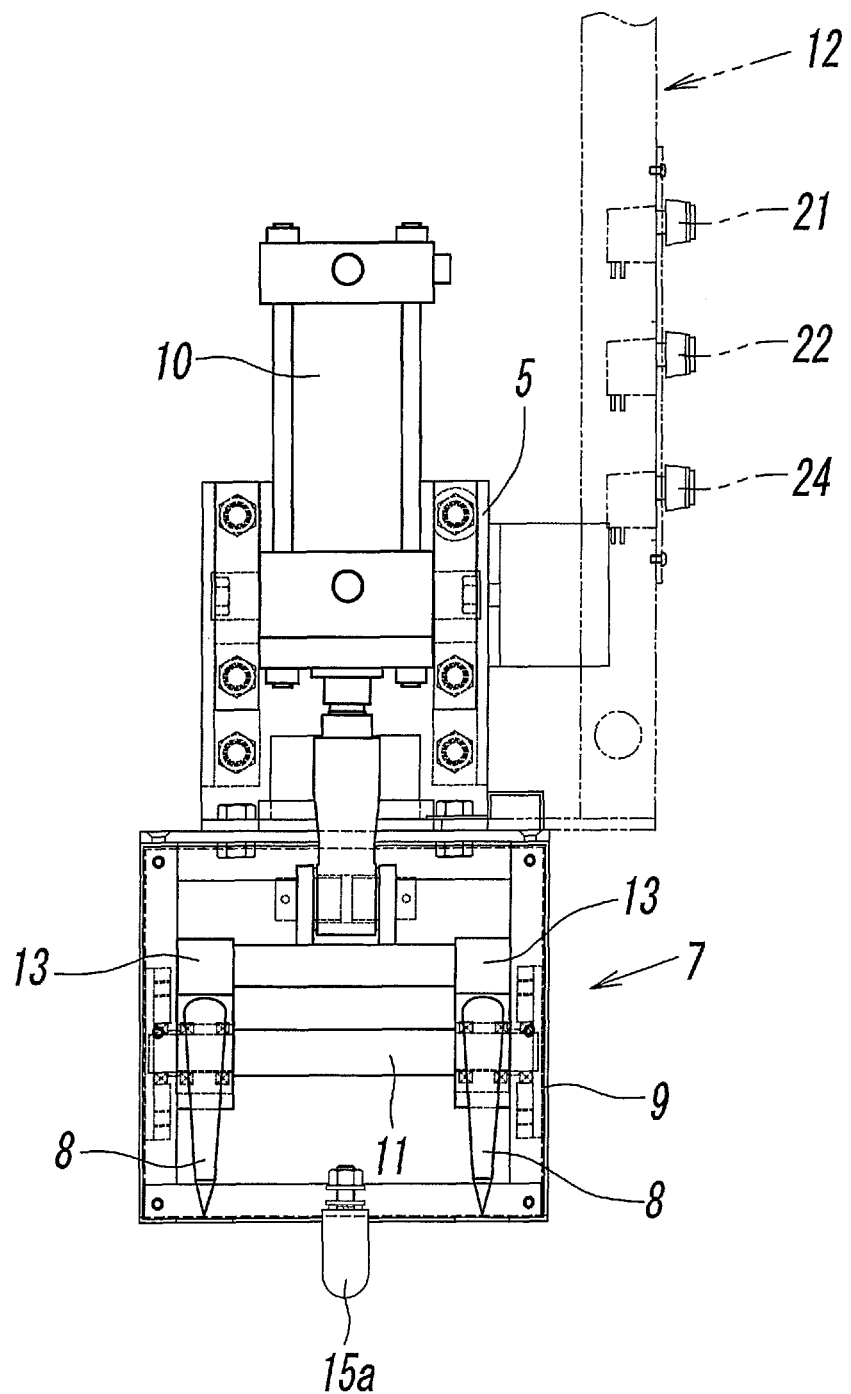
FIG. 7 is a side view of the gripping device in the state of FIG. 5.

The above-described lift mechanism constituting the lifting device is constituted by a hydraulically driven or, desirably, a pneumatically driven lift cylinder 2, and is configured such that the distal end of the piston rod 3 of the lift cylinder 2 is suspended from the traverser 34 or 43 that is a conveying device or the like illustrated in FIG. 1 to FIG. 4 described above through a universal joint 4 that is capable of being tilted, and such that, as illustrated in FIG. 5 to FIG. 7, the gripping device 7 or the like of the bale rubber 51 can be attached to the cylinder body 2a of the lift cylinder 2 through a frame 5.

The gripping device 7 that is attached to the above-described frame 5 and that grips the bale rubber 51 with a plurality of claws 8 schematically includes, for example, a claw housing case 9 that covers the above-described claws 8 in order to maintain safety, a pair of grip cylinders 10 that are driven in order for the above-described claws 8 to grip onto the bale rubber 51 and to the release the grip, and the operation handle 12 or the like used to guide the shifting of the gripping device 7 that is performed manually.

Moreover, the above-described operation handle 12 includes a few types of operation elements for, for example, lifting and lowering of the bale rubber 51, which is gripped by the claws 8, with the lift cylinder 2, and gripping of the bale rubber 51 with the claws 8, the release of the grip, and the like with the grip cylinders 10.

The gripping device 7 of the bale rubber 51 that is attached to the above-described lift cylinder 2 through the frame 5 includes a flat claws-entering-and-exiting surface 9a on the undersurface side of the claw housing case 9 attached to the above-described frame 5, the claws-entering-and-exiting surface 9a being abutted against the upper surface of the bale rubber 51 when gripping to lift the bale rubber 51, and is configured such that a plurality of pairs of claws 8 are supported inside the claw housing case 9 so as to be capable of gripping the bale rubber 51 by being rotationally driven about a support shaft 11 disposed horizontally and such that the pairs of claws 8 can be rotationally driven with the drive mechanism formed of the above-described pair of grip cylinders 10. In the above-described claw housing case 9, opening portions 9b through which the plurality of claws 8 appear and disappear are formed on the above-described claws-entering-and-exiting surface 9a. In order to abut the claws-entering-and-exiting surface 9a of the above-described claw housing case 9 against the upper surface of the bale rubber 51 inside the box-shaped pallet 50, the planar shapes of the claw housing case 9 and the lift cylinder 2 supporting the claw housing case 9 need to be smaller than the planar shape of a typical bale rubber 51.

In the above-described claws 8, the distal end is made acute by gradually reducing the diameter from a base end side to a distal end side of a round steel bar and a central axis line L of the round steel bar is bent so as to form an arc shape with a uniform radius of curvature. Furthermore, desirably, the surfaces of the claws 8 are polished into a smooth mirror surface so as to prevent foreign matter from adhering thereto and to prevent the foreign matter from getting mixed with the bale rubber 51 upon gripping of the bale rubber 51.

Each of the above-described plurality of pairs of claws 8 is supported by a corresponding drive arm 13 among a plurality of drive arms 13 that rotate about the support shaft 11 installed in the middle portion inside the claw housing case 9 in a horizontal manner and is attached to the corresponding drive arm 13 so that the central axis line L with the above-described radius of curvature is positioned along a circumference extending about the axis line of the support shaft 11, in other words, each of the plurality of pairs of claws 8 is attached to the corresponding drive arm 13 in a bent state that forms the above-described arc shape about the axis line of the rotational drive. Furthermore, when each of the acute distal end portions of the paired claws 8 protrudes into the bale rubber 51 through the opening portions 9b that are each provided in the claws-entering-and-exiting surface 9a on the undersurface side of the above-described claw housing case 9, each of the paired claws 8 are disposed so as to oppose each other.

Regarding the driving of the above-described claws 8, the grip cylinders 10 that are drive mechanisms of the claws 8 are supported against the above-described frame 5 with shafts 10b so as to be rotatable within a flat surface that is parallel to the rotation surface of the claws 8, the distal ends of the piston rods 10a of the grip cylinders 10 are rotatably coupled to the base ends of the claws 8 attached to the above-described drive arms 13, the above-described drive arms 13 are made to rotate about the support shaft 11 by the drive of the piston rods 10a of the grip cylinders 10, and, with the above, the claws 8 that are attached to the drive arms 13 are rotated about the support shaft 11 in the direction extending along the central axis line L of the arc shaped bends of the above-described claws 8. Accordingly, the above-described plurality of claws 8 are pierced into the upper surface of the bale rubber 51 from the upper surface of the bale rubber 51 in a gripping manner through the above-described opening portions 9b of the above-described claws-entering-and-exiting surface 9a while drawing the above-described arcuate trajectory.

Note that in the exemplary embodiment illustrated in the drawings, the claws 8, the tip of which are disposed so as to oppose each other, are each attached to the tip of the corresponding one of the two pairs of left and right drive arms 13 rotating about a single support shaft 11 disposed inside the above-described claw housing case 9 in a horizontal manner and, consequently, the bale rubber 51 is held by the claws 8 at the four corners thereof when viewed in plan view. Such an arrangement of the claws 8 is significantly effective for gripping the bale rubber in a stable manner with a simple configuration; however, the support shaft 11 is not limited to a single support shaft 11 and the support shaft 11 may be a pair of parallel support shafts in which each support shaft supports the drive arms 13 that rotate in the same direction. Furthermore, as in the exemplary embodiment illustrated in the drawings, the above-described claws 8 are not limited to a case in which the plurality of pairs of claws 8 are pierced into the bale rubber from directly confronting directions to grip the bale rubber, and the configuration may be such that the claws 8 are pierced into the bale rubber 51 from directions that do not directly confront each other to grip the bale rubber 51. Moreover, while in the exemplary embodiment illustrated in the drawings described above, the drive arms 13 are supported by the support shaft 11 disposed horizontally, the configuration may be such that the claws that are bent in an arc shape are each driven in a manner gripping the bale rubber 51 in a direction that draws the above-described arcuate trajectory with a link mechanism, other driving force transmission mechanisms, or the like without providing the support shaft.

The depth in which the claws 8 are pierced into the bale rubber in order to, as described above, grip the bale rubber 51, which is the object of the lifting using the claws 8, in a stable manner mainly differs by the thickness of the bale rubber 51; however, generally, ¼ to ½ of the mean thickness of the bale rubber 51 that is to be conveyed is appropriate. Note that, regarding the manner in which the above-described claws 8 are pierced, it is appropriate that the arcuate central axis line L of each of the distal ends of the opposing pair of claws 8 does not become horizontal at a piercing limit and, moreover, each of the distal end portions of the above-described pair of claws are at a position that do not come into contact with each other.

Since the claws 8 that grip the above-described bale rubber 51 have acute shapes as described above, a grip safety mechanism that does not injure the fingers and hands of the operator needs to be equipped in the gripping device 7 itself so that unless a gripping operation is performed in a state in which the claws-entering-and-exiting surface 9a of the claw housing case 9 is abutted against and the upper surface of the bale rubber 51, the claws 8 do not protrude from the claw housing case 9.

In order to equip the above-described grip safety mechanism, the above-described gripping device 7 is configured such that the claws-entering-and-exiting surface 9a of the claw housing case 9 is formed in a flat shape, a detection tip 15a of the projected contact sensor 15 for detecting contact made with the bale rubber 51 is elastically disposed on the claws-entering-and-exiting surface 9a so as to allow the detection tip 15a to appear and disappear, the detection tip 15a brought into contact with the upper surface of the bale rubber 51 is retreated to operate the contact sensor 15, and with a contact signal that has been sent out by the contact sensor 15, an operation circuit of the grip cylinders 10 driving the claws 8 is switched to a state allowing gripping of the bale rubber 51 with the claws 8 to be performed with a gripping operation element described below.

A further specific description will be given with reference to FIG. 10. In the operation circuit of the grip cylinders 10 that are drive mechanisms of the claws 8 gripping the bale rubber 51, a direction control valve 14 that is switched to supply/discharge a pressure fluid to either of head-side pressure chambers 10h and rod-side pressure chambers 10r of the grip cylinders 10 is provided, and since when the detection tip 15a of the contact sensor 15 is not in contact with the bale rubber 51, the directional control valve constituting the contact sensor 15 is closed, the above-described direction control valve 14 is maintained at a switching position in which the pressure fluid of the rod-side pressure chambers 10r and the pressure fluid of the head-side pressure chambers 10h of the grip cylinders 10 are both sealed with no entering and exiting. On the other hand, when the detection tip 15a of the contact sensor 15 is in contact with the bale rubber 51, or is in pressure contact with the upper surface of the bale rubber 51, upon descending of the gripping device 7 with the lift cylinder 2, the directional control valve constituting the contact sensor 15 is in an open state. Accordingly, either one or both of a pair of operation elements (for gripping) 21 are pressed and the above-described direction control valve 14 is switched by a pilot fluid pressure sent through the directional control valve constituting the contact sensor 15, and the direction control valve 14 is maintained at a switching position in which the flow of pressure fluid from a pressure fluid source 26 flows into the head-side pressure chambers 10h of the lift cylinder 2 and, at the same time, the pressure fluid of the rod-side pressure chambers 10r is discharged through a speed control valve 28. Accordingly, the gripping operation can be performed, in other words, the grip safety mechanism is configured by providing the above-described direction control valve 14 in the operation circuit of the grip cylinders 10.

Accordingly, when the claws-entering-and-exiting surface 9a of the above-described claw housing case 9 is not in contact with the bale rubber 51, the detection tip 15a of the above-described contact sensor 15 is in a protruded state from the claws-entering-and-exiting surface 9a and the contact sensor 15 is in a state in which no contact signal is output therefrom; accordingly, the operation circuit of the grip cylinders 10 driving the claws 8 does not operate the grip cylinders 10 even if the above-described gripping operation element is operated, and safety of the operator is secured.

Note that the detailed operation of the above-described grip safety mechanism will be further described later with reference to FIG. 10.

Furthermore, in the above-described gripping device 7, when a grip release operation element described below is touched by mistake and if the claws 8 move out from the bale rubber 51 while the gripped bale rubber is conveyed, an unforeseen danger is posed on the operator. Accordingly, a grip release safety mechanism needs to be equipped for maintaining safety of the operator so that the gripped bale rubber will not fall off unless the bale rubber 51 is transferred to the targeted conveying place.

In order to equip the release safety mechanism in the gripping device 7, a press sensor 16 that detects, as a signal of whether to enable or disable the pressing force of the above-described grip release operation element, the pressing load received by the lift cylinder 2 upon transferring the bale rubber 51 gripped with the claws 8 to the transfer place, and a press protrusion 16a that is elastically pushed against the above-described press sensor 16 when the bale rubber 51 comes into pressure contact with the transfer place of the bale rubber 51 with the lowering of the cylinder body 2a of the above described lift cylinder 2 are provided inside the above-described claw housing case 9. Accordingly, by operating only the grip release operation element under a state in which the press protrusion 16a is elastically abutted against the above-described press sensor 16 allowing the claws 8 to be released, the cancellation of the operation gripping the bale rubber with the claws 8 is allowed through the operation circuit of the grip cylinders 10 that are drive mechanisms of the above described claws 8.

Describing further in a specific manner, the above-described release safety mechanism is configured by providing the above-described direction control valve 14 in the operation circuit of the grip cylinders 10 for gripping the bale rubber 51 with the claws 8, the direction control valve 14 switching the supply/discharge of the pressure fluid to either of the head-side pressure chambers 10h or the rod-side pressure chambers 10r in the grip cylinders 10 with the output of the directional control valve constituting the press sensor 16 when the above-described press protrusion 16a is in pressure contact with the above described press sensor 16, and switching the supply passage of the fluid pressure to the grip cylinders 10 in the direction in which the claws 8 that are pierced into the bale rubber 51 are released by switching the flow path of the direction control valve 14 to the side that allows the claws 8 to be released with the output of the above-described press sensor 16 and by enabling the pressing force of the above-described grip release operation element.

Figure 10:
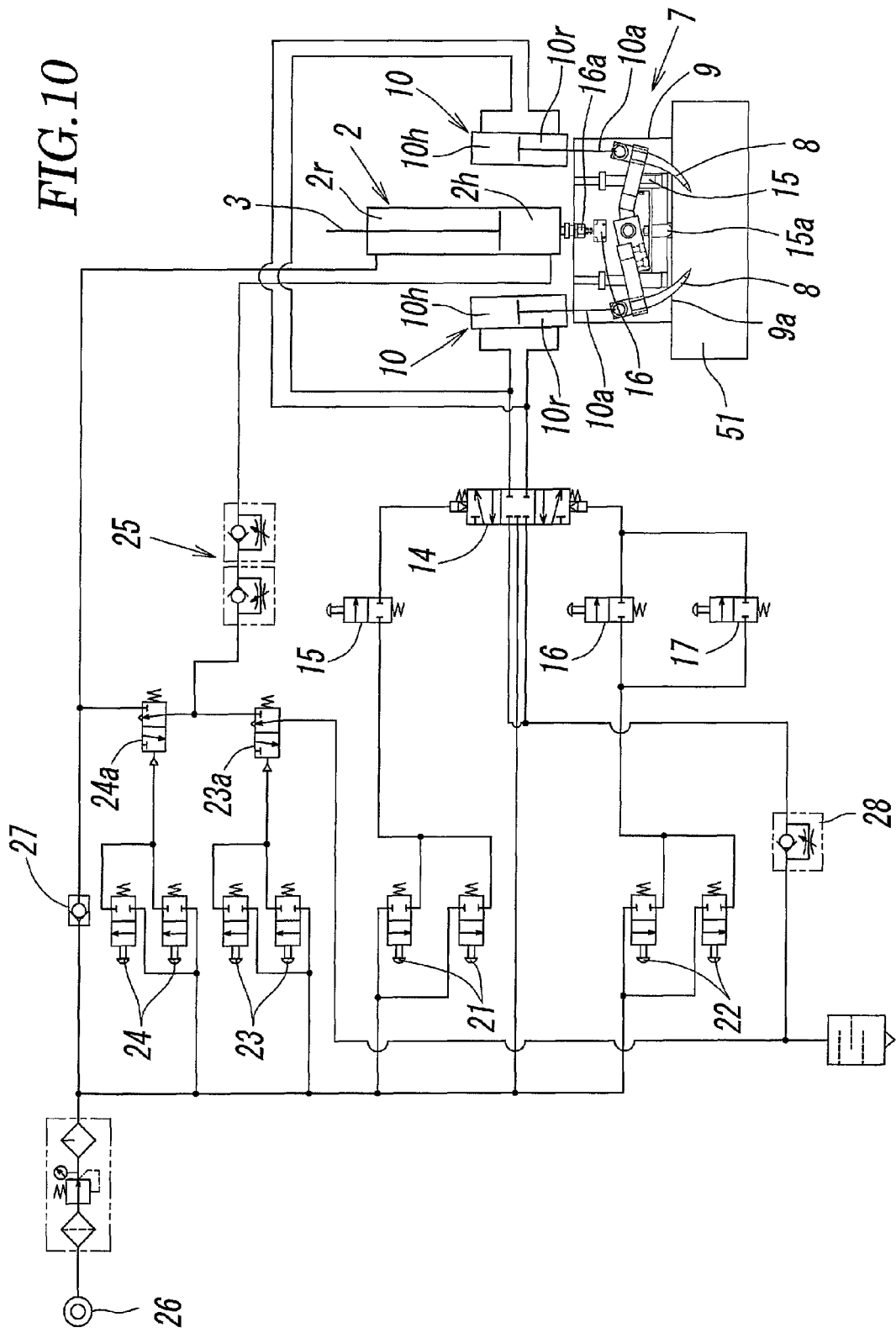
FIG. 10 is a circuit diagram of a pneumatic circuit operated by the various operation elements.

Note that the sensor 17 in FIG. 10 is an additional member and the same kind of drive control considering safety and manipulability can be performed by the sensor 17 as well.

Figure 8:
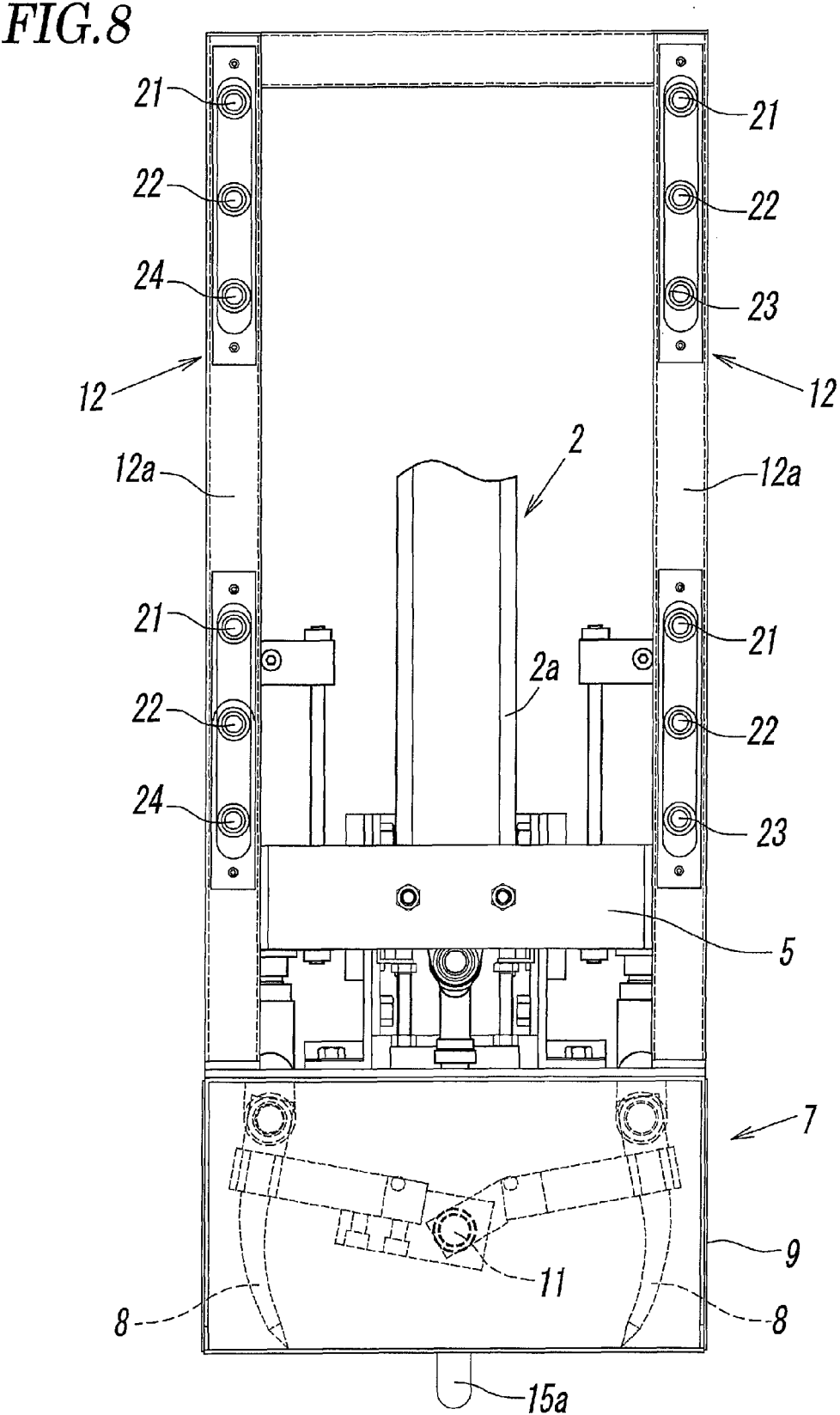
FIG. 8 is a front view illustrating a state in which operation handles equipped with various operation elements are attached to the gripping device.
Figure 9:
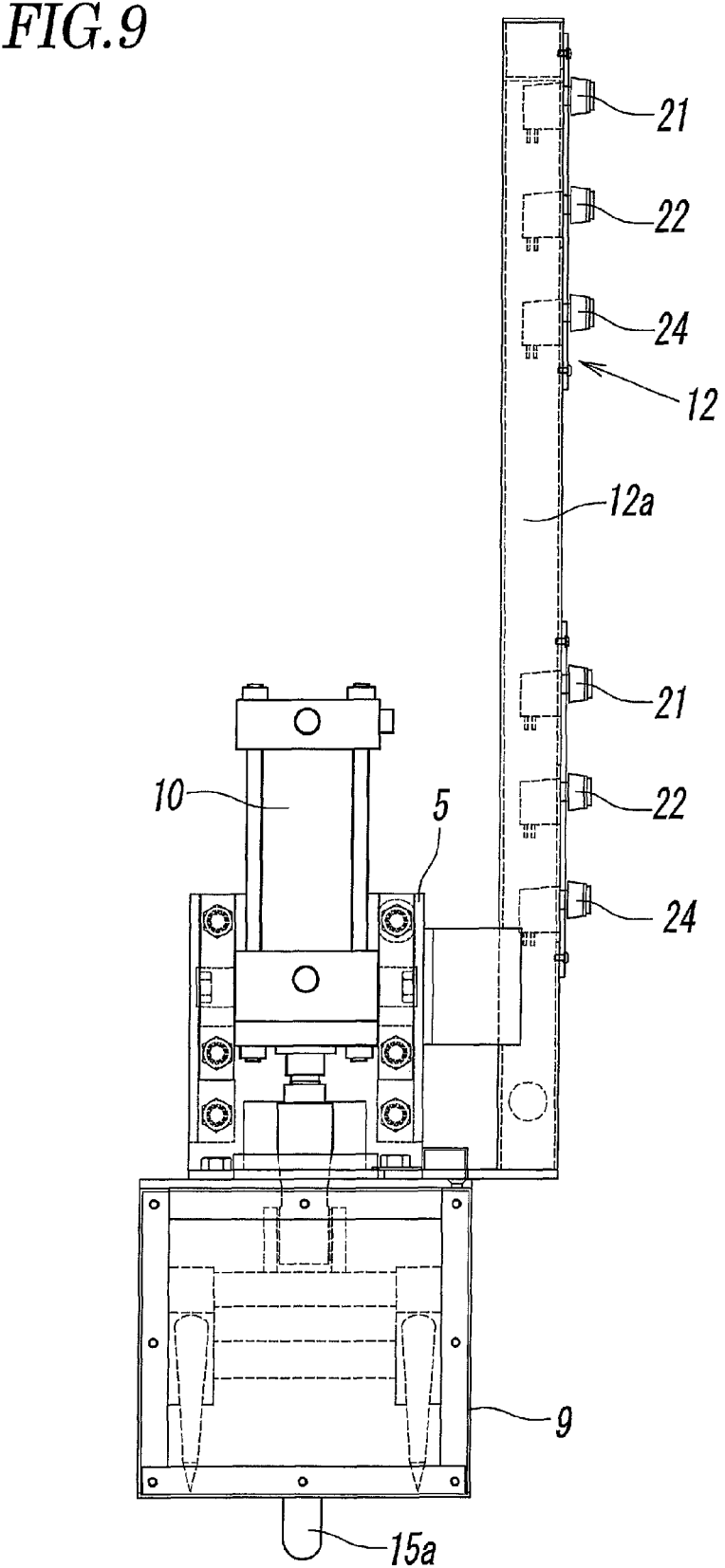
FIG. 9 is a side view of the same.

Furthermore, as clearly illustrated in FIG. 8 and FIG. 9, a pair of left and right operation handles 12 for manually guiding the gripping device 7 to the bale rubber 51 are provided in an erecting manner on the frame 5 of the above-described gripping device 7. The operation handles 12 are elongated in the up-down direction so as to allow a person to easily perform a lifting/lowering operation, a gripping operation, and a lateral movement operation of the gripping device 7. Furthermore, as described in detail below, a plurality of pairs of (two pairs in the exemplary embodiment) operation elements 21 to 24 for gripping and releasing the grip of the bale rubber 51 with the claws 8 performed by the grip cylinders 10 and for manipulating the lifting/lowering performed with the lift cylinder 2 of the gripping device 7 are provided in the operation handles 12. As illustrated in the drawings, pairs of operation elements 21 to 24 are desirably provided above and below the operation portions 12a provided in the intermediate positions of the operation handles 12.

Since the gripping device 7 needs to be allowed to be manually manipulated easily even when the gripping device 7 is at both a lowered position in which the claws-entering-and-exiting surface 9a of the claw housing case 9 is brought in contact with the bale rubber 51 that is the object of the lifting and that is accommodated inside the deep box-shaped pallet 50 generally having a depth of 1.2 m, and a lifted position allowing the gripped bale rubber 51 to be moved to the outside of the box-shaped pallet 50 after being passed over the lateral side wall of the box-shaped pallet 50, as illustrated in FIG. 8 and FIG. 9, it is desirable that the plurality of pairs of operation elements 21 to 24 described above that have the same function are provided and the arrangement thereof are set in a practically easy-to-use manner and, further, that can be regarded that safety and manipulability were considered, that the operation elements that need to have reliability in manipulation (for example, the operation elements 21 and 22) is performed through AND output of the operation elements provided in the left and right operation handle 12.

Referring to mainly FIG. 10, operation of the above-described bale rubber lifting and conveying device will be described.

Basically, in lifting and conveying the bale rubber, the above-described plurality of claws 8 are each, with the drive mechanism, protruded through the corresponding opening portion 9b provided in the above-described claws-entering-and-exiting surface 9a while the above-described claws-entering-and-exiting surface 9a is abutted against the bale rubber 51 which is the object of the lifting, the bale rubber is gripped by piercing the plurality of claws 8 from the upper surface of the bale rubber 51 into the bale rubber so as to draw an arcuate trajectory along the central axis line L of the claws 8 bent in an arc shape (see FIG. 5 and FIG. 6), and manually transferring the bale rubber to the target position with a conveying mechanism that moves laterally after lifting the bale rubber up with the lift mechanism.

When the bale rubber 51 accommodated inside the box-shaped pallet 50 is to be gripped and conveyed, for example, in the jib crane-type conveying device 30 or the like illustrated in FIG. 1 and FIG. 2, after the operator manually operating the operation handles 12 of the gripping device 7 guides the claw housing case 9 of the gripping device 7 to the middle portion of the bale rubber 51 that is to be gripped, when the operation element (for lowering) 24 of the operation handle 12 is pressed, the flow path of the hand valve manipulated by the operation element 24 is released and a directional control valve 24a is switched by the pilot fluid flowing in the flow path and a rod-side pressure chamber 2r and a head-side pressure chamber 2h of the lift cylinder 2 communicates through the above-described directional control valve 24a and a speed control valve 25, accordingly, the rod-side pressure chamber 2r of the lift cylinder 2 is compressed with the weight of the cylinder body 2a of the lift cylinder 2 and the gripping device 7 coupled thereto and the pressure fluid of the pressure chamber 2r is controlled by the speed control valve 25 and is sent to the head-side pressure chamber 2h; accordingly, the claw housing case 9 is lowered until the claws-entering-and-exiting surface 9a on the undersurface side of the claw housing case 9 is brought into contact with the upper surface of the bale rubber 51 inside the box-shaped pallet 50.

By pressing the operation element (for lowering) 24 as described above to urge the claw housing case 9 against the bale rubber 51, the detection tip 15a of the contact sensor 15 is brought into contact with the bale rubber 51 and is elastically pushed into the claw housing case 9, and with the pressing force of the detection tip 15a, the direction control valve 14 that switches the flow path of both the pressure chambers 10h and 10r of the grip cylinders 10 is operated through the directional control valve constituting the contact sensor 15 and, as a result, the direction control valve 14 is set to a state allowing the claws 8 to be pierced into the bale rubber 51. Accordingly, when either one or both of the operation elements (for gripping) 21 in the left and right operation handles 12 are pressed, the claws 8 are protruded from the claw housing case 9 and are pierced into the bale rubber 51.

Note that when the claw housing case 9 is not in pressure contact with the bale rubber 51 in a reliable manner and when the contact sensor 15 is not urged against the bale rubber 51, even if the gripping operation element 21 is operated by mistake and is pushed, the claws 8 will not come out and will not hurt the fingers, hands, and the like of the operator.

In the state in which the bale rubber 51 is gripped by the claws 8, when the finger is released from the operation element (for gripping) 21 of the operation handle 12 and the operation element (for lifting) 23 is pressed, a directional control valve 23a is switched and the head-side pressure chamber 2h of the lift cylinder 2 is released to the outside, and, with the function of the pressure fluid of the rod-side pressure chamber 2r, the gripping device 7 is lifted over the lateral sidewall of the box-shaped pallet 50 while gripping the bale rubber 51; accordingly, the operation handle 12 can be operated and the bale rubber 51 can be manually pushed and conveyed to an optional position. For example, if the lifted bale rubber 51 is to be loaded on a conveyor, when the undersurface side of the bale rubber 51 comes into contact with the conveyor and when the press protrusion 16a is elastically urged against the press sensor 16 at the connection portion between the frame 5 and the claw housing case 9, the directional control valve constituting the above-described press sensor 16 is switched in accordance with the above, and when it is detected that the bale rubber 51 has been placed on the conveyor in a stable manner, pushing the operation element (for releasing the grip) 22 operates the grip cylinders 10 in a direction that retreats the claws 8 and the gripping of the bale rubber 51 is released.

Note that, as a measure against abnormality, such as when there is some kind of loaded object or the like on the place where the lifted bale rubber 51 is to be loaded such that the undersurface side of the bale rubber 51 cannot be made to be in surface contact with the place and, as a result, the press sensor 16 is unable to be operated and the gripping of the bale rubber 51 cannot be released, an abnormality canceling device that operates the press sensor 16 with a separate member may be attached such that with the operation thereof, the grip cylinders 10 are operated in a direction that retreats the claws 8 to allow cancellation of the gripping of the bale rubber 51.

In the lifting and conveying device of the rubber bale described in detail above, only the lift cylinder 2 and the grip cylinders 10 are mechanically driven by motive power, and these components do not require large motive power in particular; accordingly, it is desirable that the driving force is configured in a simple manner using only compressed air such that the amount of air pressure consumed for operation is, while dependent on the number of operations of the above described cylinder, kept at an extremely minute amount of motive power.

Furthermore, in the lifting and conveying device of the rubber bale that includes the above-described pneumatic circuit, even when there is leakage of pressure air in the supply/discharge system of pressure air supplied to or discharged from the lift cylinder 2 and the grip cylinders 10 or even when supply of the pressure air is interrupted, while the bale rubber 51 is hung by the gripping device 7, the bale rubber and the gripping device that are heavy loads will not drop all at once but will be gradually lowered until the end of the cylinder stroke is reached and no dangerous situation will occur.

Note that in the pneumatic circuit in FIG. 10, the reference numeral 26 is a pressure air source, 27 is a check valve that maintains, except for when the directional control valve 24a is operated, the gripping device 7 in the lifted state by suppressing discharge of the pressure air of the rod-side pressure chamber 2r of the lift cylinder 2, and 28 is a speed control valve that prevents danger by suppressing abrupt operation of the claws 8 by suppressing the discharge speed of the pressure air discharged from the pressure chambers on the rod side and the head side of the grip cylinders 10.

What is claimed is:

1. A bale rubber lifting and conveying device, comprising:
    a gripping device that grips bale rubber that is an object of lifting with a claw, wherein
    in an undersurface side of a claw housing case of the gripping device serving as a claws-entering-and-exiting surface that comes into contact with an upper surface of the bale rubber when gripping the bale rubber, opening portions through which a plurality of the claws appear and disappear are formed on the claws-entering-and-exiting surface, and in the claw housing case, a distal end of each of the plurality of the claws is made acute by gradually reducing the diameter from a base end side to the distal end side and a central axis line of each of the plurality of claws is bent so as to form an arc shape about an axis line of a rotational drive, the plurality of claws being supported so as to be capable of being rotated in a direction extending along the central axis line having the arc shape about the axis line of the rotational drive disposed horizontally;
    a claw drive mechanism is provided on a frame of the gripping device for piercing the plurality of claws into the upper surface of the bale rubber in a gripping manner through the opening portions of the claws-entering-and-exiting surface while drawing a trajectory with the arcuate shape;
    a detection tip of a contact sensor is disposed on the claws-entering-and-exiting surface of the claw housing case that detects contact made with the bale rubber and a grip safety mechanism disposed in an operation circuit of the claw drive mechanism that grips the bale rubber, the grip safety mechanism making the claws non-operative by opening the operation circuit when the contact sensor in not in contact with the bale rubber;
    the grip safety mechanism cancels the non-operative state by a contact signal generated by the contact sensor when in contact with the bale rubber and enables an operation of gripping the bale rubber with the claws by closing the operation circuit of the claw drive mechanism upon operation of a gripping operation element; and
    the gripping device is coupled to a conveying mechanism that laterally moves the gripping device through a lift mechanism including a hydraulically driven lift cylinder.

2. The bale rubber lifting and conveying device according to claim 1, wherein
    the contact sensor comprises a directional control valve that operates when detecting contact between the detection tip disposed on the claws-entering-and-exiting surface and the bale rubber;
    the grip safety mechanism comprises a direction control valve in which a pilot fluid pressure that is output upon operation of the directional control valve serves as the contact signal to switch a supply flow path that supplies fluid pressure to a grip cylinder constituting at least part of the drive mechanism of the claws to a direction that makes the claws be pierced into the bale rubber; and
    a flow path is formed in which the operation of gripping the bale rubber with the claws is allowed upon operation of the gripping operation element while in a state in which the contact signal is output.

3. The bale rubber lifting and conveying device according to claim 2, wherein
    the claw housing case is provided with a press sensor detecting a pressing load by a lift cylinder to the transfer place of the bale rubber gripped with the claws and a press protrusion that is pressed against the press sensor when pressing against the transfer place of the bale rubber with the lift cylinder;
    a release safety mechanism that allows release of the claws upon an output of the press sensor when the press protrusion comes into pressure contact with the press sensor is disposed in the operation circuit of the drive mechanism for gripping the bale rubber with the claws; and
    upon an operation of a grip release operation element while the release safety mechanism is in a state allowing the release of the claws, the operation circuit of the claw drive mechanism is switched allowing the cancellation of the operation of gripping the bale rubber with the claws.

4. The bale rubber lifting and conveying device according to claim 3, wherein
    the press sensor comprises a directional control valve detecting the pressing load by the lift cylinder to the transfer place of the bale rubber gripped with the claws;
    the release safety mechanism includes guiding a pilot fluid pressure that is output upon operation of the directional control valve to a direction control valve that switches the supply flow path of the fluid pressure supplied to the grip cylinder constituting at least part of the claw drive mechanism to a direction that releases the claws pierced into the bale rubber; and
    a flow path is formed that cancels the operation of gripping the bale rubber with the claws upon operation of the grip release operation element while in a state in which the direction control valve is switched to a direction that releases the claws.

5. The bale rubber lifting and conveying device according to claim 4, wherein
    the claws provided in a plurality of pairs are each attached to a corresponding one of drive arms that rotates about a support shaft disposed in a horizontal manner inside the claw housing case and are disposed so as to oppose each other when distal ends that are made acute protrude out through the opening portions of the claws-entering-and-exiting surface, and a claw drive mechanism operates the drive arms so that the drive arms rotate about the support shaft;
    the support shaft is installed in a middle portion inside the claw housing case in a horizontal manner and supports a plurality of pairs of the drive arms of the claws;
    grip cylinders that constitute at least part of the drive mechanism are each supported against the frame so as to be rotatable within a flat surface that is parallel to the rotation surface of the corresponding claw and the distal ends of piston rods of the grip cylinders are each coupled to the base end of the corresponding claw in a rotatable manner; and a depth in which the claws are pierced into the bale rubber, the bale rubber being an object of lifting, is ¼ to ½ of the mean thickness of the bale rubber and, at a piercing limit, the central axis line of each of the distal ends of opposing pair of claws having an arcuate shape does not become horizontal and, moreover, each of the distal ends of the pair of claws are at a position that the distal ends do not come into contact with each other.

6. The bale rubber lifting and conveying device according to claim 3, wherein the claws provided in a plurality of pairs are each attached to a corresponding one of drive arms that rotates about a support shaft disposed in a horizontal manner inside the claw housing case and are disposed so as to oppose each other when distal ends that are made acute protrude out through the opening portions of the claws-entering-and-exiting surface, and a claw drive mechanism operates the drive arms so that the drive arms rotate about the support shaft;

the support shaft is installed in a middle portion inside the claw housing case in a horizontal manner and supports a plurality of pairs of the drive arms of the claws;

grip cylinders that constitute at least part of the drive mechanism are each supported against the frame so as to be rotatable within a flat surface that is parallel to the rotation surface of the corresponding claw and the distal ends of piston rods of the grip cylinders are each coupled to the base end of the corresponding claw in a rotatable manner; and a depth in which the claws are pierced into the bale rubber, the bale rubber being an object of lifting, is ¼ to ½ of the mean thickness of the bale rubber and, at a piercing limit, the central axis line of each of the distal ends of opposing pair of claws having an arcuate shape does not become horizontal and, moreover, each of the distal ends of the pair of claws are at a position that the distal ends do not come into contact with each other.

7. The bale rubber lifting and conveying device according to claim 2, wherein the claws provided in a plurality of pairs are each attached to a corresponding one of drive arms that rotates about a support shaft disposed in a horizontal manner inside the claw housing case and are disposed so as to oppose each other when distal ends that are made acute protrude out through the opening portions of the claws-entering-and-exiting surface, and a claw drive mechanism operates the drive arms so that the drive arms rotate about the support shaft;

the support shaft is installed in a middle portion inside the claw housing case in a horizontal manner and supports a plurality of pairs of the drive arms of the claws;

grip cylinders that constitute at least part of the drive mechanism are each supported against the frame so as to be rotatable within a flat surface that is parallel to the rotation surface of the corresponding claw and the distal ends of piston rods of the grip cylinders are each coupled to the base end of the corresponding claw in a rotatable manner; and a depth in which the claws are pierced into the bale rubber, the bale rubber being an object of lifting, is ¼ to ½ of the mean thickness of the bale rubber and, at a piercing limit, the central axis line of each of the distal ends of opposing pair of claws having an arcuate shape does not become horizontal and, moreover, each of the distal ends of the pair of claws are at a position that the distal ends do not come into contact with each other.

8. The bale rubber lifting and conveying device according to claim 1, wherein the claws provided in a plurality of pairs are each attached to a corresponding one of drive arms that rotates about a support shaft disposed in a horizontal manner inside the claw housing case and are disposed so as to oppose each other when distal ends that are made acute protrude out through the opening portions of the claws-entering-and-exiting surface, and a claw drive mechanism operates the drive arms so that the drive arms rotate about the support shaft;

the support shaft is installed in a middle portion inside the claw housing case in a horizontal manner and supports a plurality of pairs of the drive arms of the claws;

grip cylinders that constitute at least part of the drive mechanism are each supported against the frame so as to be rotatable within a flat surface that is parallel to the rotation surface of the corresponding claw and the distal ends of piston rods of the grip cylinders are each coupled to the base end of the corresponding claw in a rotatable manner; and a depth in which the claws are pierced into the bale rubber, the bale rubber being an object of lifting, is ¼ to ½ of the mean thickness of the bale rubber and, at a piercing limit, the central axis line of each of the distal ends of opposing pair of claws having an arcuate shape does not become horizontal and, moreover, each of the distal ends of the pair of claws are at a position that the distal ends do not come into contact with each other.

9. A method for lifting and conveying bale rubber, comprising:

supporting a plurality of claws inside a claw housing case of a gripping device including a claws-entering-and-exiting surface on an undersurface side that comes into contact with an upper surface of bale rubber that is an object of the lifting, opening portions through which a plurality of the claws appear and disappear being formed on the claws-entering-and-exiting surface, a distal end of each of the plurality of claws being made acute by gradually reducing the diameter from a base end side to a distal end side and a central axis line of each of the plurality of claws being bent so as to form an arc shape about an axis line of a rotational drive, the plurality of claws being supported so as to be capable of being rotationally driven in a direction extending along the central axis line having the arc shape about the axis line of the rotational drive disposed horizontally;

providing a claw drive mechanism on a frame of the gripping device for piercing the plurality of claws into the upper surface of the bale rubber in a gripping manner through the opening portions of the claws-entering-and-exiting surface while drawing a trajectory with the arcuate shape;

gripping the bale rubber by protruding each of the plurality of claws through a corresponding one of openings provided in the claws-entering-and-exiting surface and by piercing the plurality of claws into the bale rubber from an upper surface of the bale rubber so as to draw a trajectory having the arc shape, while the claws-entering-and-exiting surface is abutted against the bale rubber that is the object of the lifting; and transferring the bale rubber that has been gripped with the claws to a target position with a conveying mechanism that moves laterally, after lifting the bale rubber together with the claw housing case with a lift mechanism including a hydraulically driven lift cylinder; wherein an operation of gripping the bale rubber with the claws is performed by providing a detection tip of a contact sensor disposed on the claws-entering-and-exiting surface of the claw housing case and detecting contact made with the bale rubber on the claws-entering-and-exiting surface of the claw housing case, disabling a grip safety mechanism in the operation circuit of the drive mechanism gripping the bale rubber with a contact signal generated by the contact sensor upon contact with the bale rubber, the grip safety mechanism making the claws non-operative by opening the operation circuit when the contact sensor in not on contact with the bale rubber, and enabling driving of the claws performed with the drive mechanism upon operation of a gripping operation element; and wherein the grip safety mechanism cancels the non-operative state by a contact signal generated by the contact sensor when in contact with the bale rubber and enables an operation of gripping the bale rubber with the claws by closing the operation circuit of the claw drive mechanism upon operation of the gripping operation element.

10. The method for lifting and conveying bale rubber according to claim 9, wherein a depth in which the claws are pierced into the bale rubber, the bale rubber being an object of lifting, is ¼ to ½ of the mean thickness of the bale rubber and, at a piercing limit, the central axis line of each of the distal ends of opposing pair of claws having an arcuate shape does not become horizontal and, moreover, each of the distal ends of the pair of claws grips the rubber bale while at a position that the distal ends do not come into contact with each other.

* * * * *